(12) United States Patent
Nagaoka

(10) Patent No.: US 6,428,889 B1
(45) Date of Patent: Aug. 6, 2002

(54) ADHESIVE AND RETROREFLECTIVE ARTICLE COMPRISING THE ADHESIVE

(75) Inventor: Yoshiyuki Nagaoka, Yamagata (JP)

(73) Assignee: 3M Innovative Properties Company, St. Paul, MN (US)

( * ) Notice: Subject to any disclaimer, the term of this patent is extended or adjusted under 35 U.S.C. 154(b) by 33 days.

(21) Appl. No.: 09/665,971

(22) Filed: Sep. 20, 2000

(30) Foreign Application Priority Data

Oct. 6, 1999 (JP) ............................................. 11-285632

(51) Int. Cl.$^7$ ................................................. B32B 27/30
(52) U.S. Cl. ............... 428/355 AC; 525/50; 526/318.4; 526/319; 526/328.5; 526/329.7
(58) Field of Search ...................... 428/355 AC; 525/50; 526/318.4, 319, 328.5, 329.7

(56) References Cited

U.S. PATENT DOCUMENTS 4,851,278 A    7/1989   Enanoza

FOREIGN PATENT DOCUMENTS

| JP | 61-9479     | 1/1986  |
|----|-------------|---------|
| JP | 2-218779    | 8/1990  |
| JP | 2-218780    | 8/1990  |
| JP | 03012471    | 1/1991  |
| JP | 06340851    | 12/1994 |
| WO | WO 96/19543 | 6/1996  |

*Primary Examiner*—Robert Dawson
*Assistant Examiner*—Christopher M. Keehan
(74) *Attorney, Agent, or Firm*—Carolyn A. Fischer

(57) ABSTRACT

An adhesive which is a reaction product of polymerizing, and curing or crosslinking a monomer component containing 80–85 wt % of an alkyl (meth)acrylate ester monomer with an alkyl group of 1–18 carbon atoms and 15–20 wt % of an unsaturated monomer with at least one polar functional group, and which has a gel percentage of 50–85% after curing or crosslinking.

11 Claims, 1 Drawing Sheet

ADHESIVE AND RETROREFLECTIVE ARTICLE COMPRISING THE ADHESIVE

This applications claims priority from Japanese Patent Application No. 11-285632, filed Oct. 6, 1999.

FIELD OF THE INVENTION

The present invention relates to an adhesive, particularly a tacky acrylic-based heat sensitive adhesive. The invention further relates to, for example, retroreflective articles that employ the adhesive.

BACKGROUND OF THE INVENTION

Indicators such as outdoor road signs, road markings and signboards have conventionally been equipped with visible retroreflective elements to provide surveyors with visible guidance. Retroreflective elements are usually worked into sheet forms and mounted on based materials such as aluminum sheets to form the indicators. When such indicators are situated on guard rails around corner turns, they can provide particularly effective visible guidance to drivers. In such cases, the indicator will usually be constructed of a retroreflective element on the surface of a curved base material.

Acrylic-based adhesives, which have excellent weather resistance, are typically used for mounting of retroreflective elements on base materials. Acrylic-based adhesives include types that are heat sensitive. Such heat sensitive adhesives are known as hot-melt adhesives, and they are heat activatable. That is, the heat sensitive adhesive may be heated to wet the adherend surface, and then the heat removed for hardening to complete the adhesive. No flammable solvent is required.

Acrylic-based heat sensitive adhesives are often given special properties by modification with various additives such as disclosed, for example, in Japanese Unexamined Patent Publication (Kokai) No. 61-9479, Japanese Unexamined Patent Publication (Kokai) No. 2-218780 and Japanese Unexamined Patent Publication (Kokai) No. 2-218779.

Japanese Unexamined Patent Publication (Kokai) No. 61-9479 discloses an acrylic-based heat sensitive adhesive to which a crystalline plasticizer is added. Addition of a plasticizer generally tends to lower the cohesive power of the adhesive. Typical retroreflective elements are protected by being covered with flexible plastic, and are sometimes formed on the surfaces of curved base materials as mentioned above. In such cases the retroreflective element deforms, producing bending stress. Therefore, when the bending stress lowers the cohesive power of the heat sensitive adhesive as disclosed in Japanese Unexamined Patent Publication (Kokai) No. 61-9479, there is a tendency toward interlayer peeling, such as pop-off, to occur between the retroreflective element and the base material.

Japanese Unexamined Patent Publication (Kokai) No. 2-218780 discloses a heat sensitive adhesive designed to improve the flow properties on the adherend surface with heat, by addition of a benzylidene sorbitol derivative. However, the improvement in flow properties generally tends to reduce the cohesive power of the adhesive. This also therefore results in a risk of the interlayer peeling described above.

Japanese Unexamined Patent Publication (Kokai) No. 2-218779 discloses a heat sensitive adhesive designed to improve the cohesive power by addition of an N-acylamino acid amide. However, it is known that the N-acylamino acid amide is not able to impart cohesive power of a degree that can inhibit the aforementioned interlayer peeling for heat sensitive adhesives.

It is preferred for a heat sensitive adhesive to be given appropriate tackiness so that the retroreflective element can be slid on the substrate to alter its position, but can no longer be slid once fixed. In the heat sensitive adhesives disclosed in Japanese Unexamined Patent Publications (Kokai) No. 2-218779 and No. 2-218780, a tackifier is added as necessary to allow positioning of the retroreflective element, but for heat sensitive adhesives such as also disclosed in Japanese Patent Specification No. 2599725, this tends to cause a reduction in cohesive power and deterioration of the aging resistance. As a result, such heat sensitive adhesives do not allow fixing of the retroreflective element without sliding.

SUMMARY OF THE INVENTION

It is therefore an object of the present invention to provide an adhesive which exhibits high flow properties upon heating and the tackiness necessary to allow positioning by sliding, and which can exhibit cohesive power that prevents sliding and interlayer peeling after fixing, as well as a retroreflective member that employs it.

The present invention, in one embodiment, relates to an adhesive which is a reaction product of a monomer component containing 80–85 wt % of an alkyl (meth)acrylate ester monomer with an alkyl group of 1–18 carbon atoms and 15–20 wt % of an unsaturated monomer with at least one polar functional group, and which has a gel fraction of 50–85% after curing or crosslinking.

BRIEF DESCRIPTION OF FIGURES

In the following explanation of embodiments of the invention, it will be readily apparent to those skilled in the art that the invention is not limited to these embodiments. Throughout the drawings, the same denotations are used for the same or corresponding parts.

DETAILED DESCRIPTION OF THE INVENTION

Figure 1:
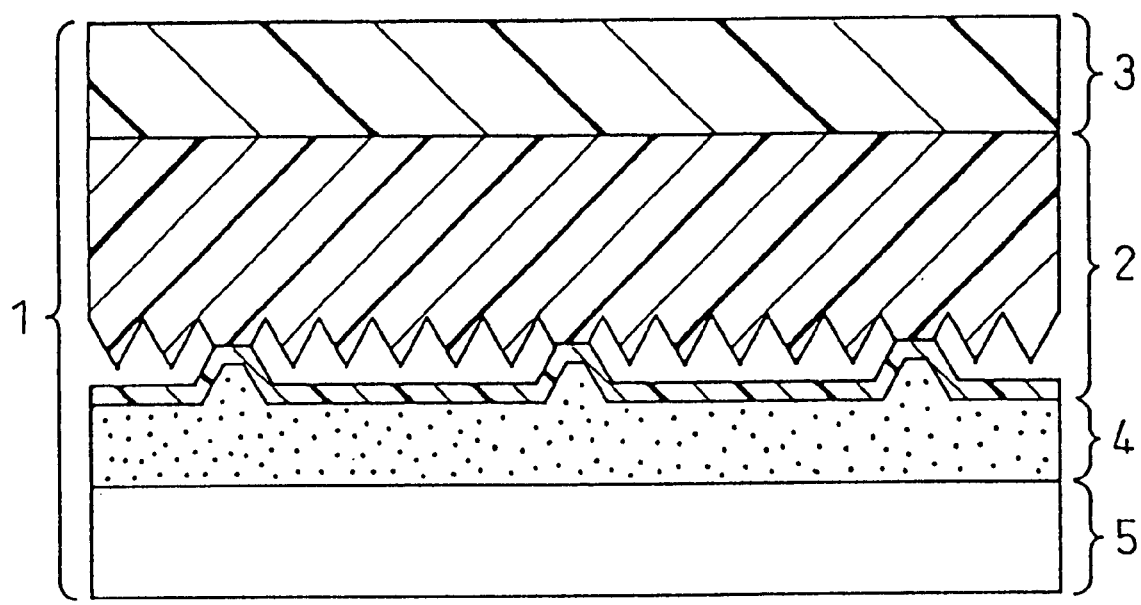
FIG. 1 is a lateral cross-sectional view of a retroreflective sheet according to the invention.

The lateral cross-sectional view of FIG. 1 is a general illustration of a retroreflective sheet (retroreflective member) 1 according to a preferred embodiment of the invention. The retroreflective sheet 1 of the illustrated embodiment is provided with a retroreflective element 2 of the prism lens-type (which will sometimes be referred to herein as "cube corner-type"). As is well-known, prism lens-type retroreflective elements are regularly equipped with a plurality of triangular pyramid lens elements on the surface thereof. Such a retroreflective element is normally fabricated by shaping an acrylic resin, polycarbonate resin or polyester resin, which has excellent weather resistance and transparency. In the construction, each lens element is surrounded by three mirror faces, so that light incident thereto can be effectively reflected in order by the three mirror faces and then directed in the opposite direction.

A transparent protective layer 3 is formed on the surface of the retroreflective element. The protective layer 3 is usually a flexible film composed of a transparent plastic, for example, an acrylic resin, polycarbonate resin or polyester resin.

On the other side of the retroreflective element there is situated an adhesive layer 4, and a release layer 5 is further formed on the adhesive layer 4 to protect the adhesive layer 4 when necessary prior to attaching the retroreflective element 2 onto the base material.

According to the invention, the adhesive layer is formed from an acrylic-based adhesive with excellent weather resistance, etc. Specifically, the acrylic-based adhesive can be obtained by polymerizing, and curing or crosslinking a monomer component containing an alkyl (meth)acrylate ester monomer with an alkyl group and an unsaturated monomer with at least one polar functional group.

The alkyl (meth)acrylate ester monomer serves to impart tackiness and heat flow properties to the adhesive layer. That is, the adhesive layer may be heated to wet the adherend surface, and then the heat removed for hardening to complete the adhesive. No flammable solvent is required.

As mentioned above, the alkyl (meth)acrylate ester monomer includes an alkyl group, and the number of carbon atoms included therein determines the desired glass transition temperature provided to the adhesive layer, thus allowing control of the tackiness and flow properties. The alkyl group preferably has 1–18 carbon atoms. In such cases, when the aforementioned resin-composed cube corner-type retroreflective element is exposed to a temperature of about 70° C. or above, it will be possible for the adhesive layer, without losing its function, to wet the base material surface by heat and then solidify when the heat is removed to complete the adhesion. In certain embodiments, when the alkyl group has 19 or more carbon atoms, the tackiness is diminished, making it difficult to accomplish temporary attachment.

The unsaturated monomer is preferably a polar component including a functional group with strong polarity, allowing it to impart cohesive power to the adhesive layer. When the unsaturated monomer is acrylic acid, the carboxylic acid polar functional group has a very high cohesion energy and a particularly effective increase in the cohesive power of the adhesive layer is achieved. However, a lower proportion of the unsaturated monomer in the monomer component is preferred for satisfactory maintenance of the hot-melt coating property, described below. On the other hand, a higher proportion of the unsaturated monomer is preferred in order to avoid reduced cohesive power and more difficult positioning due to the improved tackiness of the adhesive layer. Preferably, therefore, the unsaturated monomer content is 15–20 wt % of the monomer component, and the alkyl (meth)acrylate ester is 80–85 wt % of the monomer component.

The alkyl (meth)acrylate ester monomer described above is preferably one that includes an alkyl group of 1–4 carbon atoms. While not intending to be bound by theory, when a polymer is formed from an alkyl (meth)acrylate ester monomer having such an alkyl group, it is believed that the groups become intertangled in the adhesive layer, thus increasing the cohesive power. A particularly effective increase in cohesive power of the adhesive layer can be achieved if the alkyl (meth)acrylate ester monomer contains at least 30 wt % of alkyl groups of 1–4 carbon atoms. Ethyl acrylate is preferred as the alkyl (meth)acrylate ester monomer having such an alkyl group because it is readily obtainable. With an adhesive layer having the cohesive power increased in this manner it is possible to form a retroreflective element on a curved base material. This is because it prevents interlayer peeling, such as pop-off, from occurring between the retroreflective element and the base material.

The adhesive can be formed using a curing or crosslinking agent for the monomer component. A preferred curing or crosslinking agent is one that can crosslink a polymer copolymerized by irradiation of an electron beam or ultraviolet rays, such as acryloyloxybenzophenone. The curing or crosslinking agent is preferably present at 0–0.2 part by weight to 100 parts by weight of the monomer component. If the curing or crosslinking agent is present at greater than about 0.2 part by weight, too much crosslinking of the polymer will make the adhesive lose adhesiveness, since the adhesive will tend to be more difficult to be softened by heat. If the curing or crosslinking agent is present at less than about 0.05 part by weight, the crosslinking of the polymer will tend to be more difficult and a sufficient cohesiveness cannot be achieved.

The adhesive preferably has a weight-average molecular weight of 400,000 to 800,000 and a gel percentage of 50–80%. If the adhesive layer has a weight-average molecular weight of lower than about 400,000 it will not be afforded with high cohesive power, and this will tend to result in interlayer peeling when attached to curved base materials, for example, while if it has a weight-average molecular weight of higher than about 800,000 the higher viscosity will tend to render hot-melt coating more difficult and result in an unsatisfactory coating appearance. If the adhesive layer has a gel percentage of lower than about 50% it will not be afforded with high cohesive power, and this will tend to result in interlayer peeling when attached to curved base materials, while if it has a gel percentage of higher than about 80% the heat activation will tend to become more difficult, making it impossible to complete the adhesion.

From these viewpoints, then, it is acceptable to add to the adhesive composition before polymerization which will form an adhesive according to the present invention after polymerization, a heat stabilizer to limit reduction in the molecular weight of the adhesive layer during hot-melt coating, an initiator to initiate polymerization, or a chain transfer agent to control the molecular weight of the adhesive layer formed.

A preferred embodiment of the invention has been explained above, but it will be understood that the present invention is not restricted thereto. The retroreflective element is not limited to the aforementioned cube corner type, and it may be constructed by orientation of a number of glass beads, for example. Alternatively, the retroreflective element may be a capsule lens type or encapsulated lens type.

EXAMPLES

Examples 1–14

First, (1) butyl acrylate (BA), (2) ethyl acrylate (EA), (3) acrylic acid (AA), (4) a commercially available photoinitiator available under the trade designation "Irgacure 651" from Ciba-Geigy, (5) a heat stabilizer available under the trade designation "Irganox 1076" from Ciba-Geigy, 86), (6) a chain transfer agent consisting of isooctyl thioglycolate (IOTG) and (7) a curing or crosslinking agent consisting of acryloyloxybenzophenone (ABP) were combined in the proportions listed in Table 1 to prepare a monomer solution (adhesive composition).

TABLE 1

Conditions for Formulation and Crosslinking

| Example | BA | EA | IOA | IBA | AA | NNDMA | Irg651 | Irg1076 | IOTG | ABP | Crosslinking | |
|---|---|---|---|---|---|---|---|---|---|---|---|---|
| Example | | | | | | | | | | | | |
| 1 | 55 | 30 | | | 15 | | 0.15 | 0.20 | 0.07 | 0.10 | 400 | mJ/sqcm |
| 2 | 55 | 30 | | | 15 | | 0.15 | 0.20 | 0.09 | 0.10 | 400 | mJ/sqcm |
| 3 | 55 | 30 | | | 15 | | 0.15 | 0.20 | 0.11 | 0.10 | 400 | mJ/sqcm |
| 4 | 52.5 | 30 | | | 17.5 | | 0.15 | 0.20 | 0.07 | 0.10 | 400 | mJ/sqcm |
| 5 | 52.5 | 30 | | | 17.5 | | 0.15 | 0.20 | 0.09 | 0.10 | 400 | mJ/sqcm |
| 6 | 52.5 | 30 | | | 17.5 | | 0.15 | 0.20 | 0.11 | 0.10 | 400 | mJ/sqcm |
| 7 | 50 | 30 | | | 20 | | 0.15 | 0.20 | 0.07 | 0.10 | 400 | mJ/sqcm |
| 8 | 50 | 30 | | | 20 | | 0.15 | 0.20 | 0.09 | 0.10 | 400 | mJ/sqcm |
| 9 | 50 | 30 | | | 20 | | 0.15 | 0.20 | 0.11 | 0.10 | 400 | mJ/sqcm |
| 10 | | 30 | 55 | | 15 | | 0.15 | 0.20 | 0.07 | 0.10 | 400 | mJ/sqcm |
| 11 | 82.5 | | | | 17.5 | | 0.15 | 0.20 | 0.07 | 0.10 | 400 | mJ/sqcm |
| 12 | 82.5 | | | | 17.5 | | 0.15 | 0.20 | 0.09 | 0.10 | 400 | mJ/sqcm |
| 13 | 82.5 | | | | 17.5 | | 0.15 | 0.20 | 0.11 | 0.10 | 400 | mJ/sqcm |
| 14 | 55 | 30 | | | 15 | | 0.32 | 0.20 | 0.07 | 0.10 | 400 | mJ/sqcm |
| 15 | 55 | 30 | | | 15 | | 0.15 | 0.20 | 0.07 | 0.10 | 5 | Mrad |
| 16 | 55 | 30 | | | 15 | | 0.15 | 0.20 | 0.09 | 0.10 | 5 | Mrad |
| 17 | 52.5 | 30 | | | 17.5 | | 0.15 | 0.20 | 0.07 | 0.10 | 5 | Mrad |
| 18 | 52.5 | 30 | | | 17.5 | | 0.15 | 0.20 | 0.09 | 0.10 | 5 | Mrad |
| 19 | 50 | 30 | | | 20 | | 0.15 | 0.20 | 0.07 | 0.10 | 5 | Mrad |
| 20 | 50 | 30 | | | 20 | | 0.15 | 0.20 | 0.09 | 0.10 | 5 | Mrad |
| Comparative Example | | | | | | | | | | | | |
| 1 | 55 | 30 | | | 15 | | 0.15 | 0.20 | 0.07 | 0.10 | 10 | Mrad |
| 2 | 55 | 30 | | | 15 | | 0.15 | 0.20 | 0.07 | 0.10 | 15 | Mrad |
| 3 | 55 | 30 | | | 15 | | 0.15 | 0.20 | 0.07 | 0.10 | 20 | Mrad |
| 4 | 55 | 30 | | | 15 | | 0.15 | 0.20 | 0.09 | 0.10 | 10 | Mrad |
| 5 | 55 | 30 | | | 15 | | 0.15 | 0.20 | 0.09 | 0.10 | 15 | Mrad |
| 6 | 55 | 30 | | | 15 | | 0.15 | 0.20 | 0.09 | 0.10 | 20 | Mrad |
| 7 | 52.5 | 30 | | | 17.5 | | 0.15 | 0.20 | 0.07 | 0.10 | 10 | Mrad |
| 8 | 52.5 | 30 | | | 17.5 | | 0.15 | 0.20 | 0.07 | 0.10 | 15 | Mrad |
| 9 | 52.5 | 30 | | | 17.5 | | 0.15 | 0.20 | 0.07 | 0.10 | 20 | Mrad |
| 10 | 52.5 | 30 | | | 17.5 | | 0.15 | 0.20 | 0.09 | 0.10 | 10 | Mrad |
| 11 | 52.5 | 30 | | | 17.5 | | 0.15 | 0.20 | 0.09 | 0.10 | 15 | Mrad |
| 12 | 52.5 | 30 | | | 17.5 | | 0.15 | 0.20 | 0.09 | 0.10 | 20 | Mrad |
| 13 | 50 | 30 | | | 20 | | 0.15 | 0.20 | 0.07 | 0.10 | 10 | Mrad |
| 14 | 50 | 30 | | | 20 | | 0.15 | 0.20 | 0.07 | 0.10 | 15 | Mrad |
| 15 | 50 | 30 | | | 20 | | 0.15 | 0.20 | 0.07 | 0.10 | 20 | Mrad |
| 16 | 50 | 30 | | | 20 | | 0.15 | 0.20 | 0.09 | 0.10 | 10 | Mrad |
| 17 | 50 | 30 | | | 20 | | 0.15 | 0.20 | 0.09 | 0.10 | 15 | Mrad |
| 18 | 50 | 30 | | | 20 | | 0.15 | 0.20 | 0.09 | 0.10 | 20 | Mrad |
| 19 | | | 75 | | 10 | 15 | 0.15 | 0.20 | 0.07 | 0.10 | 400 | mJ/sqcm |
| 20 | | | 70 | | 10 | 20 | 0.15 | 0.20 | 0.07 | 0.10 | 400 | mJ/sqcm |
| 21 | 75 | | | | 10 | 15 | 0.15 | 0.20 | 0.07 | 0.10 | 400 | mJ/sqcm |
| 22 | 70 | | | | 10 | 20 | 0.15 | 0.20 | 0.07 | 0.10 | 400 | mJ/sqcm |
| 23 | | | 70 | 20 | 10 | | 0.15 | 0.20 | 0.07 | 0.10 | 400 | mJ/sqcm |
| 24 | | | 70 | 20 | 10 | | 0.15 | 0.20 | 0.05 | 0.10 | 400 | mJ/sqcm |
| 25 | | | 70 | 20 | 10 | | 0.15 | 0.20 | 0.03 | 0.10 | 400 | mJ/sqcm |
| 26 | | | 70 | 20 | 10 | | 0.15 | 0.20 | 0.07 | 0.10 | 1 | Mrad |
| 27 | | | 70 | 20 | 10 | | 0.15 | 0.20 | 0.07 | 0.10 | 2 | Mrad |
| 28 | | | 70 | 20 | 10 | | 0.15 | 0.20 | 0.07 | 0.10 | 3 | Mrad |
| 29 | | | 70 | 20 | 10 | | 0.15 | 0.20 | 0.07 | 0.10 | 4 | Mrad |
| 30 | | | 70 | 20 | 10 | | 0.15 | 0.20 | 0.07 | 0.10 | 5 | Mrad |
| 31 | | | 70 | 20 | 10 | | 0.15 | 0.20 | 0.07 | 0.10 | 10 | Mrad |
| 32 | | | 70 | 20 | 10 | | 0.15 | 0.20 | 0.05 | 0.10 | 1 | Mrad |
| 33 | | | 70 | 20 | 10 | | 0.15 | 0.20 | 0.05 | 0.10 | 2 | Mrad |
| 34 | | | 70 | 20 | 10 | | 0.15 | 0.20 | 0.05 | 0.10 | 3 | Mrad |
| 35 | | | 70 | 20 | 10 | | 0.15 | 0.20 | 0.05 | 0.10 | 4 | Mrad |
| 36 | | | 70 | 20 | 10 | | 0.15 | 0.20 | 0.05 | 0.10 | 5 | Mrad |
| 37 | | | 70 | 20 | 10 | | 0.15 | 0.20 | 0.05 | 0.10 | 10 | Mrad |
| 38 | | | 70 | 20 | 10 | | 0.15 | 0.20 | 0.03 | 0.10 | 1 | Mrad |
| 39 | | | 70 | 20 | 10 | | 0.15 | 0.20 | 0.03 | 0.10 | 2 | Mrad |
| 40 | | | 70 | 20 | 10 | | 0.15 | 0.20 | 0.03 | 0.10 | 3 | Mrad |
| 41 | | | 70 | 20 | 10 | | 0.15 | 0.20 | 0.03 | 0.10 | 4 | Mrad |
| 42 | | | 70 | 20 | 10 | | 0.15 | 0.20 | 0.03 | 0.10 | 5 | Mrad |
| 43 | | | 70 | 20 | 10 | | 0.15 | 0.20 | 0.03 | 0.10 | 10 | Mrad |
| 44 | 55 | 30 | | | 15 | | 0.15 | 0.20 | 0.07 | 0.20 | 400 | mJ/sqcm |

Next, an ultraviolet lamp (VC7692 Fluorescent Lamp, product of SYLVANIA CO.) with an intensity of 3.5 mW/cm² with a wavelength of 350 nm was used for irradiation of ultraviolet light onto the solution to provide an integrated energy of 1,750 mJ/cm², for copolymerizing to obtain an acrylic-based polymer precursor.

The weight-average molecular weight and inherent viscosity (also known as the "logarithmic viscosity number") of the precursor were measured. The weight-average molecular weight was determined using gel permeation chromatography (GPC). The inherent viscosity was measured at 25° C., and was calculated from the value measured with a Cannon-Fenske Viscometer (SO85148#50, product of Shibata Scientific Instruments, KK.).

The precursor was then heated using a hot-melt coater and kept at 200–230° C., after which a continuous film was formed to a thickness of about 30 μm on a belt-shaped release sheet with a width of 250 mm. The hot-melt coating property of the precursor was confirmed during formation of the film. More specifically, the hot-melt coating property was evaluated based on the appearance of the coated film of the precursor, using the following 3-level scale. The results are set forth in Table 2 in the column, "Applicability For Hot Melt Coating."

(i)○—smooth with satisfactory appearance.

(ii)Δ—slight defects such as gelling, herringbones or fish-eyes present to an extent which was not recognized upon transfer onto the sheet.

(iii)×—considerable defects such as gelling, herringbones or fish-eyes present to an extent which was recognized upon transfer onto the sheet, or occurring on uncoated sections.

The ultraviolet lamp mentioned above was then used for irradiation of ultraviolet rays onto the precursor film to accomplish photocrosslinking to form an adhesive layer. The gel percentage of the adhesive layer was then measured. The gel percentage is defined as the value given by the following equation.

$$\text{Gel percentage (\%)} = A/B \times 100 \qquad \text{(Equation 1)}$$

(In this equation, A is the initial weight of the adhesive and B is the initial weight of the adhesive upon filtering and drying after immersion in ethyl acetate for 3 days.)

Next, a "Diamond Grade 3900G Series" Scotchlite (trademark) printed reflecting sheet (retroreflective element), commercially available from 3M Co., was cut to a width of 250 mm and then attached to the aforementioned precursor film to obtain a retroreflective sheet. The attachment was accomplished at a temperature of 70° C. and a pressure of 3 Kg/cm².

Examples 15–20

Adhesives were prepared and retroreflective sheets fabricated by the same method as in the above-mentioned examples, except that instead of ultraviolet irradiation of the respective monomer solutions prepared in Examples 1 and 2, Examples 4 and 5 and Examples 7 and 8, energy was added to an absorbed dose of 5 Mrad by irradiation with an electron beam at an acceleration voltage of 205 KV and a current of 3 mA.

Comparative Examples 1–18

Adhesives were prepared and retroreflective sheets fabricated by the same method as in the above-mentioned examples, except that instead of ultraviolet irradiation of the respective monomer solutions prepared in Examples 1 and 2, Examples 4 and 5 and Examples 7 and 8, energy was added to absorbed doses of 10 Mrad, 15 Mrad and 20 Mrad by irradiation with electron beams at an acceleration voltage of 205 KV and currents of 6.3 mA, 9.5 mA and 12.4 mA.

Comparative Examples 19 and 20

Adhesives were prepared and retroreflective sheets fabricated by the same method as in Example 1 with the formulations and crosslinking conditions shown in Table 1, except that isooctyl acrylate (IOA) and N,N-dimethylacrylamide (NNDMA) were used instead of the aforementioned butyl acrylate and ethyl acrylate.

Comparative Examples 21 and 22

Adhesives were prepared and retroreflective sheets fabricated by the same method as in Comparative Example 19 or 20 with the formulations and crosslinking conditions shown in Table 1, except that butyl acrylate was used instead of the aforementioned isooctyl acrylate.

Comparative Examples 23–43

Adhesives were prepared and retroreflective sheets fabricated by the same method as in Comparative Example 19 or 20 with the formulations and crosslinking conditions shown in Table 1, except that isobornyl acrylate (IBA) was used instead of the aforementioned N,N-dimethylacrylamide.

Evaluation

The retroreflective sheets fabricated according to the examples and comparative examples were then evaluated by (1) a positioning property test, (2) an adhesive strength test and (3) an environmental heat aging test.

(1) Positioning Property Test

The release sheet was removed from the retroreflective sheet, and within a prescribed time of about 3 minutes, a hand roller was used to attach the sheet to a curved aluminum base (S11A) having a tip with an 8 mm curvature radius, manufactured by Shingo Kizai Co., upon which the ease of positioning of the retroreflective sheet on the base was evaluated on the following 3-level scale.

(i)○—Attachment possible within the prescribed time while positioning the sheet, and wrinkles or bulges due to residual air were absent in appearance.

(ii)Δ—Attachment possible within the prescribed time while positioning the sheet, but wrinkles or bulges due to residual air were present in appearance.

(iii)×—Attachment not possible within the prescribed time while positioning the sheet, and wrinkles or bulges due to residual air were present in appearance.

(2) Adhesive Strength Test

After removing the release sheet from the retroreflective sheet, a heat lamp-equipped reduced pressure applicator was used to attach the retroreflective sheet to an aluminum base (S11A) having a tip with an 8 mm curvature radius, manufactured by Shingo Kizai Co. For the attachment, the applicator was used to heat the retroreflective sheet, maintaining a temperature of 70° C. for 90 seconds.

The retroreflective sheet attached to the aluminum base was then removed off from the applicator and allowed to naturally cool to normal temperature, and then subjected to a 90° peel test. The 90° peel test was conducted according to JIS Z 0237 of the Japan Industrial Standards. Table 2 shows the adhesive strength as measured by the 90° peel test.

(3) Environmental Heat Aging Test

After removing the release sheet from the retroreflective sheet, a heat lamp-equipped reduced pressure applicator was used to attach the retroreflective sheet to an aluminum base having a tip with an 8 mm curvature radius, manufactured by Shingo Kizai Co., by the same method as for the adhesive strength test.

The retroreflective sheet in this condition was placed in a program cycle-equipped thermo-hygrostat tester ($\mu$-504R) manufactured by Isuzu Laboratories, KK. The retroreflective sheet was then subjected to an aging test comprising 7 periodic cycles of exposure to the following conditions (i) to (viii).

(i) Exposure to −30° C. temperature and 0% relative humidity for 1.5 hours.
(ii) Exposure to 23° C. temperature and 65% relative humidity for 0.5 hour.
(iii) Exposure to 40° C. temperature and 95% relative humidity for 2 hours.
(iv) Exposure to 23° C. temperature and 65% relative humidity for 0.5 hour.
(v) Exposure to −30° C. temperature and 0% relative humidity for 1.5 hours.
(vi) Exposure to 23° C. temperature and 65% relative humidity for 0.5 hour.
(vii) Exposure to 80° C. temperature and 50% relative humidity for 11 hours.
(viii) Exposure to 23° C. temperature and 65% relative humidity for 0.5 hour.

(4) Anti-Round Edge Test

After the aging test, the retroreflective sheet was taken out of the thermo-hygrostat tester and the outer appearance of the interface between the retroreflective sheet and the aluminum base was examined through the adhesive layer. The outer appearance of the perimeter of the interface was examined and evaluated on the following 3-level scale based on the degree of peeling.

(i) ○—Absolutely no floating or peeling of the retroreflective sheet.
(ii) Δ—Slight floating of the retroreflective sheet due to cohesive failure of the adhesive.
(iii) ×—Peeling of the retroreflective sheet.

Table 2 shows the results of the measurements and evaluations described above. According to Table 2, the adhesive compositions of Examples 1–20 according to the invention can provide higher flow properties upon heating and the necessary tack for positioning compared to those of Comparative Examples 1–44, as is clear from the hot-melt coating properties and positioning properties. It was also demonstrated by the adhesive strength tests and environmental heat aging tests of the retroreflective sheets that the adhesive compositions of Examples 1–20 exhibited higher adhesive strength to prevent sliding of the retroreflective sheets, as compared to those of Comparative Examples 1–44, and maintained cohesive power to inhibit interlayer peeling even under the above-mentioned exposure conditions. The adhesive compositions of the invention can therefore exhibit high flow properties upon heating and the necessary tack to allow positioning by sliding, while also exhibiting cohesive power to inhibit sliding and interlayer peeling after being fixed.

TABLE 2

Evaluation Results of Sample Sheets

| Example | Weight Average Molecular Weight ($\times 10^4$) | Applicability For Hot Melt Coating | Gel Percentage % | Positioning Property | Adhesion kg/25 mm | Anti-Round Edge Test | IV |
|---|---|---|---|---|---|---|---|
| Example | | | | | | | |
| 1 | 69 | Δ | 81 | ○ | break | ○ | 1.17 |
| 2 | 54 | ○ | 64 | ○ | break | ○ | 0.97 |
| 3 | 46 | ○ | 64 | ○ | break | ○–Δ | 0.87 |
| 4 | 70 | Δ | 65 | ○ | break | ○ | 1.1 |
| 5 | 58 | ○ | 59 | ○ | break | ○ | 0.96 |
| 6 | 49 | ○ | 73 | ○ | break | ○–Δ | 0.83 |
| 7 | 72 | Δ | 77 | ○ | break | ○ | 1.0 |
| 8 | 62 | ○ | 56 | ○ | break | ○ | 0.89 |
| 9 | 48 | ○ | 73 | ○ | break | ○–Δ | 0.76 |
| 10 | — | ○ | 70 | ○ | break | ○–Δ | 1.12 |
| 11 | — | Δ | 73 | ○ | break | ○–Δ | 1.04 |
| 12 | — | ○ | 70 | ○ | break | ○–Δ | 0.92 |
| 13 | — | ○ | 62 | ○ | break | Δ | 0.86 |
| 14 | — | ○ | 75 | ○ | break | ○ | 1.05 |
| 15 | 69 | Δ | 73 | ○ | 0.9 | Δ | 1.17 |
| 16 | 54 | ○ | 68 | ○ | 1.1 | Δ | 0.97 |
| 17 | 70 | Δ | 76 | ○ | 0.8 | Δ | 1.1 |
| 18 | 58 | ○ | 80 | ○ | — | Δ | 0.96 |
| 19 | 72 | Δ | 85 | ○ | 0.6 | Δ | 1.0 |
| 20 | 62 | ○ | 67 | ○ | 0.6 | Δ | 0.89 |
| Camparative Example | | | | | | | |
| 1 | 69 | Δ | 89 | ○ | 0.9 | × | 1.17 |
| 2 | 69 | Δ | 93 | ○ | — | × | 1.17 |
| 3 | 69 | Δ | 96 | ○ | — | × | 1.17 |
| 4 | 54 | ○ | 89 | ○ | 1.2 | × | 0.97 |
| 5 | 54 | ○ | 89 | ○ | — | × | 0.97 |

TABLE 2-continued

Evaluation Results of Sample Sheets

| Example | Weight Average Molecular Weight (× 10⁴) | Applicability For Hot Melt Coating | Gel Percentage % | Positioning Property | Adhesion kg/25 mm | Anti-Round Edge Test | IV |
|---|---|---|---|---|---|---|---|
| 6 | 54 | ○ | 92 | ○ | — | x | 0.97 |
| 7 | 70 | Δ | 88 | ○ | 0.9 | x | 1.1 |
| 8 | 70 | Δ | 92 | ○ | — | x | 1.1 |
| 9 | 70 | Δ | 96 | ○ | — | x | 1.1 |
| 10 | 58 | ○ | 86 | ○ | 0.8 | x | 0.96 |
| 11 | 58 | ○ | 89 | ○ | — | x | 0.96 |
| 12 | 58 | ○ | 95 | ○ | — | x | 0.96 |
| 13 | 72 | Δ | 91 | ○ | 0.9 | x | 1.0 |
| 14 | 72 | Δ | 95 | ○ | — | x | 1.0 |
| 15 | 72 | Δ | 96 | ○ | — | x | 1.0 |
| 16 | 62 | ○ | — | ○ | 0.9 | x | 0.89 |
| 17 | 62 | ○ | 89 | ○ | — | x | 0.89 |
| 18 | 62 | ○ | 94 | ○ | — | x | 0.89 |
| 19 | — | — | 70 | ○ | 0.8 | Δ | 0.72 |
| 20 | — | — | 78 | ○ | 0.6 | Δ | 0.93 |
| 21 | — | — | 64 | ○ | 1.8 | Δ | 0.85 |
| 22 | — | — | 61 | ○ | 0.6 | Δ | 0.78 |
| 23 | 54 | ○ | 44 | ○ | 0.8 | Δ–x | 0.78 |
| 24 | 80 | Δ | 62 | ○ | 1.6 | Δ | 1.02 |
| 25 | 107 | x | 80 | ○ | 1.7 | Δ | 1.30 |
| 26 | 54 | ○ | 5 | ○ | — | — | 0.78 |
| 27 | 54 | ○ | 9 | ○ | — | — | 0.78 |
| 28 | 54 | ○ | 10 | ○ | 1.4 | x | 0.78 |
| 29 | 54 | ○ | 20 | ○ | — | — | 0.78 |
| 30 | 54 | ○ | 30 | ○ | 1.1 | x | 0.78 |
| 31 | 54 | ○ | 63 | ○ | 1.3 | Δ–x | 0.78 |
| 32 | 80 | Δ | 5 | ○ | — | — | 1.02 |
| 33 | 80 | Δ | 17 | ○ | — | — | 1.02 |
| 34 | 80 | Δ | 26 | ○ | 1.1 | x | 1.02 |
| 35 | 80 | Δ | 44 | ○ | — | — | 1.02 |
| 36 | 80 | Δ | 57 | ○ | 1.4 | Δ–x | 1.02 |
| 37 | 80 | Δ | 52 | ○ | 0.9 | Δ–x | 1.02 |
| 38 | 107 | x | 18 | ○ | — | — | 1.30 |
| 39 | 107 | x | 29 | ○ | — | — | 1.30 |
| 40 | 107 | x | 43 | ○ | 1.0 | x | 1.30 |
| 41 | 107 | x | 57 | ○ | — | — | 1.30 |
| 42 | 107 | x | 46 | ○ | 1.3 | Δ–x | 1.30 |
| 43 | 107 | x | 84 | ○ | 1.1 | Δ–x | 1.30 |
| 44 | — | — | 91 | ○ | 1.7 | Δ–x | 1.23 | note: The symbol "—" means that no test or measurement was conducted.

An adhesive according to the invention exhibits high flow properties upon heating and the necessary tack to allow positioning by sliding, while also exhibiting cohesive power to inhibit sliding and interlayer peeling after being fixed.

What is claimed is:

1. An adhesive comprising a reaction product of (a) a monomer component containing 80–85 wt % of an alkyl acrylate ester monomer with an alkyl group of 1–18 carbon atoms and (b) 15–20 wt % of an unsaturated monomer with at least one polar functional group, and wherein the adhesive has a gel percentage of 50–85% after curing or crosslinking.

2. An adhesive according to claim 1, characterized in that at least 30 wt % of said alkyl acrylate ester monomer is a type having an alkyl group of 1–4 carbon atoms.

3. An adhesive according to claim 1, characterized in that said alkyl acrylate ester monomer includes ethyl acrylate.

4. An adhesive according to any one of claims 1 to 3, characterized in that the polar functional group of said unsaturated monomer is carboxylic acid.

5. An adhesive according to any one of claims 1 to 3, characterized in that said unsaturated monomer is acrylic acid.

6. A retroreflective member provided with
a retroreflective element and
an adhesive layer formed on the back of said retroreflective element, characterized in that said adhesive layer consists of an adhesive which is a reaction product of polymerizing, and curing or crosslinking a monomer component containing 80–85 wt % of an alkyl acrylate ester monomer with an alkyl group of 1–18 carbon atoms and 15–20 wt % of an unsaturated monomer with at least one polar functional group, and which has a gel percentage of 50–85% after curing or crosslinking.

7. The retroreflective member according to claim 6, characterized in that at least 30 wt % of said alkyl acrylate ester monomer is a type having an alkyl group of 1–4 carbon atoms.

8. The retroreflective member according to claim 6, characterized in that said alkyl acrylate ester monomer includes ethyl acrylate.

9. The retroreflective member according to claim 6, characterized in that the polar functional group of said unsaturated monomer is carboxylic acid.

10. The retroreflective member according to claim 6, characterized in that said unsaturated monomer is acrylic acid.

11. The retroreflective member according to claim 6 wherein the retroreflective element exhibits no floating or peeling in the anti-round edge test.

* * * * *

UNITED STATES PATENT AND TRADEMARK OFFICE
CERTIFICATE OF CORRECTION

PATENT NO.   : 6,428,889 B1
DATED        : August 6, 2002
INVENTOR(S)  : Nagaoka, Yoshiyuki It is certified that error appears in the above-identified patent and that said Letters Patent is hereby corrected as shown below:

<u>Title page,</u>
Item [56], U.S. PATENT DOCUMENTS, insert -- 6,110,574  08-2000 Ochi et al. 428/220 --.
Insert -- 5,804,610 09-1998 Hamer et al. 522/182 --.

<u>Column 8,</u>
Line 57, delete "S" and insert in place thereof -- A --.

<u>Column 10,</u>
Table 2, delete "Camparative" and insert in place thereof -- Comparative --.

Signed and Sealed this

Twenty-sixth Day of August, 2003

JAMES E. ROGAN
*Director of the United States Patent and Trademark Office*